United States Patent
Li (10) Patent No.: US 10,816,863 B2
(45) Date of Patent: Oct. 27, 2020

(54) REFLECTIVE LCD PANEL INCLUDING TRANSPARENT PIXEL ELECTRODE AND COLOR FILTER LAYER STACKED TOGETHER

(71) Applicant: Shenzhen China Star Optoelectronics Semiconductor Display Technology Co., Ltd., Shenzhen (CN)

(72) Inventor: Xiang Li, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/671,174

(22) Filed: Nov. 1, 2019

(65) Prior Publication Data

US 2020/0064698 A1 Feb. 27, 2020

Related U.S. Application Data (62) Division of application No. 15/579,946, filed on Dec. 6, 2017, now Pat. No. 10,509,282.

(30) Foreign Application Priority Data

Sep. 11, 2017 (CN) .......................... 2017 1 0814427

(51) Int. Cl.
*G02F 1/1362* (2006.01)

(52) U.S. Cl.
CPC ................. *G02F 1/136209* (2013.01); *G02F 2001/136222* (2013.01); *G02F 2201/121* (2013.01); *G02F 2201/123* (2013.01); *G02F 2201/52* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0055525 A1* | 3/2008 | Igeta | ................. | G02F 1/133555 349/114 |
| 2015/0109560 A1* | 4/2015 | Guo | ....................... | B82Y 30/00 349/68 |
| 2015/0370116 A1* | 12/2015 | Chae | ................... | G02F 1/13394 349/43 |

FOREIGN PATENT DOCUMENTS

CN 102998834 * 3/2013 ........... G02F 1/1335

* cited by examiner

*Primary Examiner* — Lauren Nguyen
(74) *Attorney, Agent, or Firm* — Leong C. Lei (57) ABSTRACT

The invention provides a reflective LCD panel. The reflective LCD panel of the invention is disposed with white sub-pixel unit in the pixel unit. When the pixel electrode is disposed below the CF layer, the white sub-pixel unit is a transparent film layer and the pixel electrode is a reflective electrode, or when the white sub-pixel unit is a reflective film layer, the pixel electrode is a transparent electrode or a non-transparent electrode; when the pixel electrode is disposed above the CF layer, the white sub-pixel unit is a reflection film layer and the pixel electrode is a transparent electrode. The reflective LCD panel of the invention utilizes the combination of the white sub-pixel unit and the pixel electrode to improve the utilization of the ambient light, so as to enhance the brightness of the pixel unit and further enhance the brightness of the reflective LCD panel.

5 Claims, 7 Drawing Sheets

REFLECTIVE LCD PANEL INCLUDING TRANSPARENT PIXEL ELECTRODE AND COLOR FILTER LAYER STACKED TOGETHER

CROSS REFERENCE TO RELATED APPLICATION

This is a divisional application of U.S. patent application Ser. No. 15/579,946, filed on Dec. 6, 2017, which is a national stage of PCT Application No. PCT/CN2017/113016, filed on Nov. 27, 2017, claiming foreign priority of Chinese Patent Application No. 201710814427.9, filed on Sep. 11, 2017.

BACKGROUND OF THE INVENTION

1. Field of the Invention

The present invention relates to the field of display techniques, and in particular to a reflective liquid crystal display (LCD) panel.

2. The Related Arts

The liquid crystal display (LCD) panel provides the advantages of thinness, low power consumption, without radiation, and is widely used in mobile phones, PDA, digital camera, PC screens or notebook PC screens.

Most LCD devices on the market are backlight-typed, which includes a backlight module, an LCD panel engaged to the backlight module, and a front frame fastening the LCD panel and the backlight module. The operation principle of the LCD panel is to place the liquid crystal (LC) molecules in two parallel glass substrates. A plurality of vertical and horizontal small wires is disposed between the two glass substrates. The LC molecules are controlled to change direction by powering on or off, and the light of the backlight module is refracted to produce an image.

At present, the LCD device is categorized, based on the type of light source, transmissive type LCD, reflective LCD, and transflective LCD.

With the rise of mobile devices and wearable applications, the demand for thinness and power saving of display devices is also growing. Therefore, the development of low power consumption display device becomes increasingly important. The traditional transmissive LCD has been massively produced, and the color, quality, resolution of the products are able to meet most of the needs. However, the LCD is relatively high power consumption when the display is used in mobile and wearable devices, which restricts usage time.

Because reflective LCD can display with ambient light without the need for energy-consuming backlights, the reflective LCD shows great potential in mobile devices and wearable display applications.

Figure 1:
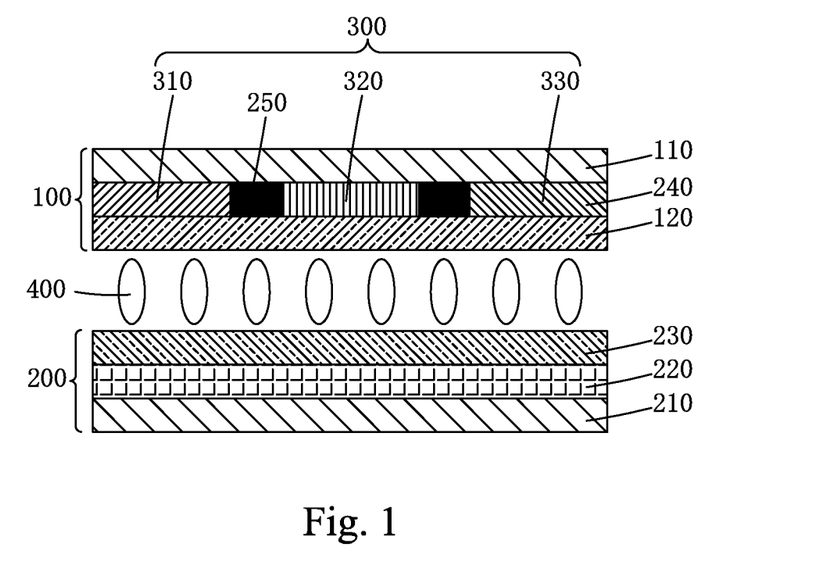
FIG. 1 is a schematic view showing the structure of a conventional reflective LCD panel.

FIG. 1 shows a schematic view of a known reflective LCD panel. As shown in FIG. 1, the reflective LCD panel comprises: an upper substrate 100 and a lower substrate 200 disposed opposite to each other, and a liquid crystal layer 400 sandwiched between the upper substrate 100 and the lower substrates 200; the upper substrate 100 comprising: a first base substrate 110, a color filter (CF) layer 240 and a black matrix (BM) disposed on the first base substrate 110, a common electrode 120 disposed on the CF layer 240 and the BM 250; the lower substrate 200 comprising: a second base substrate 210, a thin film transistor (TFT) device layer 220 disposed on the second base substrate 210, and a pixel electrode 230 disposed on the TFT device layer 220; wherein the CF layer 240 comprising a transmissive red sub-pixel unit 310, a transmissive green sub-pixel unit 320 and a transmissive blue sub-pixel unit 330 separated by the BM 250; the pixel electrode 230 is a reflective electrode. The operation principle of the reflective LCD panel is that the ambient light passes through the CF layer 240 and the LC layer 400 to reach the pixel electrode 230. Then, the pixel electrode 230 reflects the light and the reflected light passes again through the LC layer 400 and the CF layer 240, and is emitted from the surface of the upper substrate 100 to realize image display. During the operation of the reflective LCD panel, ambient light passes back and forth through the CF layer 240 and the LC layer 400, resulting in relatively large loss of ambient light and low utilization, leading to insufficient brightness of the display screen of the LCD panel.

Figure 2:
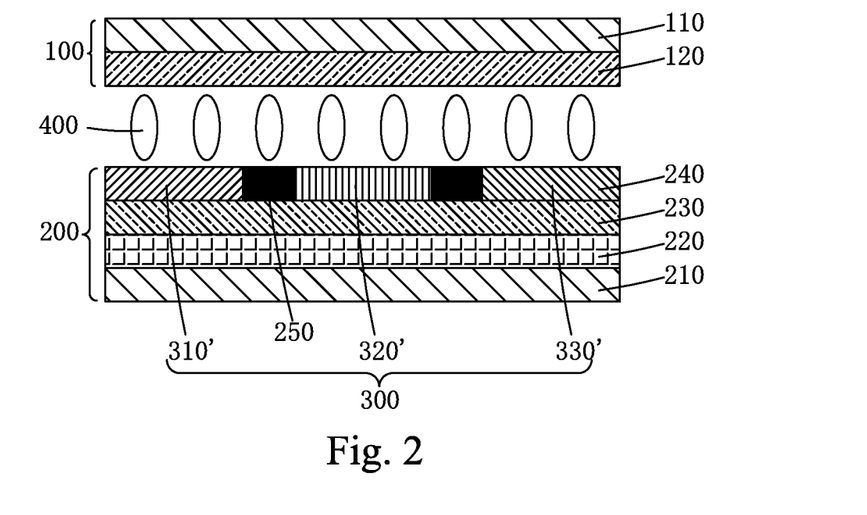
FIG. 2 is a schematic view showing the structure of another conventional reflective LCD panel.

To improve the utilization of the ambient light by the reflective LCD panel, a reflective LCD panel as shown in FIG. 2 is proposed. As shown in FIG. 2, the reflective LCD panel comprises: an upper substrate 100 and a lower substrate 200 disposed opposite to each other, and a liquid crystal layer 400 sandwiched between the upper substrate 100 and the lower substrates 200; the upper substrate 100 comprising: a first base substrate 110 and a common electrode 120 disposed the first base substrate 110; the lower substrate 200 comprising: a second base substrate 210, a thin film transistor (TFT) device layer 220 disposed on the second base substrate 210, a pixel electrode 230 disposed on the TFT device layer 220, and a CF layer 240 and a BM 250 disposed on the pixel electrode 230; wherein the CF layer 240 comprising a reflective red sub-pixel unit 310', a reflective green sub-pixel unit 320' and a reflective blue sub-pixel unit 330' separated by the BM 250; the pixel electrode 230 is a transparent electrode. Specifically, the reflective red sub-pixel unit 310' can reflect red light and absorb green light and blue light, the reflective green sub-pixel unit 320' can reflect green light and absorbs red light and blue light, and the blue reflective sub-pixel unit 330' can reflect blue light and absorb red light and green light. The operation principle of the reflective LCD panel is that the ambient light passes through the LC layer 400 to reach the CF layer 240, and then the CF layer 240 selectively absorbs and reflects the light, and the reflected light passes through the LC layer 400 again and emits from the surface of the upper substrate 100 to realize image display. During the operation of the reflective LCD panel, the ambient light passes through the CF layer 240 only once, which reduces the loss of ambient light in the CF layer 240. However, since the CF layer 240 absorbs most of the spectrum and the ambient light needs to go through the structural layers such as the LC layer 400, the upper and lower alignment films (not shown) and the first base substrate 110 twice, the loss of ambient light is still large. Therefore, the brightness of the display screen of the LCD panel still needs improvement.

SUMMARY OF THE INVENTION

The object of the present invention is to provide a reflective LCD panel, by disposing a white sub-pixel unit in the pixel unit and using the white sub-pixel in collaboration with the pixel electrode to increase the brightness of the pixel unit, leading to improving the emission brightness of the reflective LCD panel.

To achieve the above object, the present invention provides a reflective LCD panel, which comprises: an upper substrate and a lower substrate disposed opposite to each other, and a liquid crystal (LC) layer sandwiched between the upper substrate and the lower substrate; the upper substrate comprising: a first base substrate, a common electrode disposed on the first base substrate; the lower substrate comprising: a second base substrate, a thin film transistor (TFT) device layer disposed on the second base substrate, a pixel electrode disposed on the TFT device layer, and a color filter (CF) layer and a black matrix (BM) disposed on the pixel electrode;

wherein the CF layer comprising a plurality of pixel units arranged in an array, with each pixel unit comprising: a red sub-pixel unit, a green sub-pixel unit, a blue sub-pixel unit, and a white sub-pixel unit separated by the BM; the red sub-pixel unit able to reflect red light and absorb green light and blue light; the green sub-pixel unit able to reflect green light and absorb red light and blue light; the blue sub-pixel unit able to reflect blue light and absorb red light and green light;

when the white sub-pixel unit being a transparent film, the pixel electrode being a reflective electrode; when the white sub-pixel unit being a reflective film, the pixel electrode being a transparent electrode or non-transparent electrode;

when the white sub-pixel unit being a transparent film, the red light, green light and blue light able to pass through the white sub-pixel unit; when the white sub-pixel unit being a reflective film, the red light, green light and blue light able to be reflected by the white sub-pixel unit.

According to a preferred embodiment of the present invention, the red sub-pixel unit, the green sub-pixel unit, the blue sub-pixel unit, and the white sub-pixel unit of the pixel unit are arranged in one of the following three arrangements:

the first arrangement: the red sub-pixel unit, the green sub-pixel unit, the blue sub-pixel unit, and the white sub-pixel unit being arranged in a row from left to right;

the second arrangement: the red sub-pixel unit, the green sub-pixel unit, the blue sub-pixel unit, and the white sub-pixel unit being arranged in a column from top to bottom;

the third arrangement: the red sub-pixel unit, the green sub-pixel unit, the blue sub-pixel unit, and the white sub-pixel unit being arranged in an upper row and a lower row; the upper row comprising: from left to right, the red sub-pixel unit and the green sub-pixel unit; the lower row comprising: from left to right, the blue sub-pixel unit and the white sub-pixel unit; wherein the red sub-pixel unit and the blue sub-pixel unit forming a column, and the green sub-pixel unit and the white sub-pixel unit forming a column.

According to a preferred embodiment of the present invention, the red sub-pixel unit, the green sub-pixel unit, the blue sub-pixel unit, and the white sub-pixel unit have the same thickness;

when the pixel electrode is a reflective electrode, the pixel electrode is made of metal; when the pixel electrode is a transparent electrode, the pixel electrode is made of a transparent conductive metal oxide; and when the pixel electrode is a non-transparent electrode, the pixel electrode is made of metal.

According to a preferred embodiment of the present invention, the reflective LCD panel further comprises: a first alignment film disposed at a side of the upper substrate facing the LC layer; a second alignment film disposed at a side of the lower substrate facing the LC layer, an upper polarizer disposed at a side of the upper substrate facing away from the LC layer; and a lower polarizer disposed at a side of the lower substrate facing away from the LC layer; wherein the upper polarizer and the lower polarizer have absorbing axes mutually perpendicular to each other.

According to a preferred embodiment of the present invention, the reflective LCD panel further comprises: a spacer disposed between the BM and the second alignment film, the spacer and the BM are made of the same material and formed monolithically.

The present invention also provides a reflective LCD panel, which comprises: an upper substrate and a lower substrate disposed opposite to each other, and a liquid crystal (LC) layer sandwiched between the upper substrate and the lower substrate; the upper substrate comprising: a first base substrate, a common electrode disposed on the first base substrate; the lower substrate comprising: a second base substrate, a thin film transistor (TFT) device layer disposed on the second base substrate, a color filter (CF) layer and a black matrix (BM) disposed on the TFT device layer, and a pixel electrode disposed on the CF layer and the BM;

wherein the CF layer comprising a plurality of pixel units arranged in an array, with each pixel unit comprising: a red sub-pixel unit, a green sub-pixel unit, a blue sub-pixel unit, and a white sub-pixel unit separated by the BM; the red sub-pixel unit able to reflect red light and absorb green light and blue light; the green sub-pixel unit able to reflect green light and absorb red light and blue light; the blue sub-pixel unit able to reflect blue light and absorb red light and green light;

the white sub-pixel unit being a reflective film, and the pixel electrode being a transparent electrode or non-transparent electrode;

the white sub-pixel unit being a reflective film, and the red light, green light and blue light able to be reflected by the white sub-pixel unit.

According to a preferred embodiment of the present invention, the red sub-pixel unit, the green sub-pixel unit, the blue sub-pixel unit, and the white sub-pixel unit of the pixel unit are arranged in one of the following three arrangements:

the first arrangement: the red sub-pixel unit, the green sub-pixel unit, the blue sub-pixel unit, and the white sub-pixel unit being arranged in a row from left to right;

the second arrangement: the red sub-pixel unit, the green sub-pixel unit, the blue sub-pixel unit, and the white sub-pixel unit being arranged in a column from top to bottom;

the third arrangement: the red sub-pixel unit, the green sub-pixel unit, the blue sub-pixel unit, and the white sub-pixel unit being arranged in an upper row and a lower row; the upper row comprising: from left to right, the red sub-pixel unit and the green sub-pixel unit; the lower row comprising: from left to right, the blue sub-pixel unit and the white sub-pixel unit; wherein the red sub-pixel unit and the blue sub-pixel unit forming a column, and the green sub-pixel unit and the white sub-pixel unit forming a column.

According to a preferred embodiment of the present invention, the red sub-pixel unit, the green sub-pixel unit, the blue sub-pixel unit, and the white sub-pixel unit have the same thickness; the pixel electrode is made of metal; the pixel electrode is made of a transparent conductive metal oxide.

According to a preferred embodiment of the present invention, the reflective LCD panel further comprises: a first alignment film disposed at a side of the upper substrate facing the LC layer; a second alignment film disposed at a side of the lower substrate facing the LC layer, an upper polarizer disposed at a side of the upper substrate facing away from the LC layer; and a lower polarizer disposed at a side of the lower substrate facing away from the LC layer; wherein the upper polarizer and the lower polarizer have non-absorbing axes mutually perpendicular to each other.

According to a preferred embodiment of the present invention, the reflective LCD panel further comprises: a spacer disposed between the BM and the pixel electrode, the spacer and the BM are made of the same material and formed monolithically.

The present invention also provides a reflective LCD panel, which comprises: an upper substrate and a lower substrate disposed opposite to each other, and a liquid crystal (LC) layer sandwiched between the upper substrate and the lower substrate; the upper substrate comprising: a first base substrate, a common electrode disposed on the first base substrate; the lower substrate comprising: a second base substrate, a thin film transistor (TFT) device layer disposed on the second base substrate, a pixel electrode disposed on the TFT device layer, and a color filter (CF) layer and a black matrix (BM) disposed on the pixel electrode;

wherein the CF layer comprising a plurality of pixel units arranged in an array, with each pixel unit comprising: a red sub-pixel unit, a green sub-pixel unit, a blue sub-pixel unit, and a white sub-pixel unit separated by the BM; the red sub-pixel unit able to reflect red light and absorb green light and blue light; the green sub-pixel unit able to reflect green light and absorb red light and blue light; the blue sub-pixel unit able to reflect blue light and absorb red light and green light;

when the white sub-pixel unit being a transparent film, the pixel electrode being a reflective electrode; when the white sub-pixel unit being a reflective film, the pixel electrode being a transparent electrode or non-transparent electrode;

when the white sub-pixel unit being a transparent film, the red light, green light and blue light able to pass through the white sub-pixel unit; when the white sub-pixel unit being a reflective film, the red light, green light and blue light able to be reflected by the white sub-pixel unit.

wherein the red sub-pixel unit, the green sub-pixel unit, the blue sub-pixel unit, and the white sub-pixel unit of the pixel unit being arranged in one of the following three arrangements:

the first arrangement: the red sub-pixel unit, the green sub-pixel unit, the blue sub-pixel unit, and the white sub-pixel unit being arranged in a row from left to right;

the second arrangement: the red sub-pixel unit, the green sub-pixel unit, the blue sub-pixel unit, and the white sub-pixel unit being arranged in a column from top to bottom;

the third arrangement: the red sub-pixel unit, the green sub-pixel unit, the blue sub-pixel unit, and the white sub-pixel unit being arranged in an upper row and a lower row; the upper row comprising: from left to right, the red sub-pixel unit and the green sub-pixel unit; the lower row comprising: from left to right, the blue sub-pixel unit and the white sub-pixel unit; wherein the red sub-pixel unit and the blue sub-pixel unit forming a column, and the green sub-pixel unit and the white sub-pixel unit forming a column;

wherein the red sub-pixel unit, the green sub-pixel unit, the blue sub-pixel unit, and the white sub-pixel unit having the same thickness;

when the pixel electrode being a reflective electrode, the pixel electrode being made of metal; when the pixel electrode beings a transparent electrode, the pixel electrode being made of a transparent conductive metal oxide; and when the pixel electrode being a non-transparent electrode, the pixel electrode being made of metal.

further comprising: a first alignment film disposed at a side of the upper substrate facing the LC layer; a second alignment film disposed at a side of the lower substrate facing the LC layer, an upper polarizer disposed at a side of the upper substrate facing away from the LC layer; and a lower polarizer disposed at a side of the lower substrate facing away from the LC layer; wherein the upper polarizer and the lower polarizer having absorbing axes mutually perpendicular to each other;

further comprising: a spacer disposed between the BM and the second alignment film, the spacer and the BM being made of the same material and formed monolithically.

The present invention provides the following advantages. The reflective LCD panel of the present invention is disposed with white sub-pixel unit in the pixel unit. When the pixel electrode is disposed below the CF layer, the white sub-pixel unit is a transparent film layer and the pixel electrode is a reflective electrode, or when the white sub-pixel unit is a reflective film layer, the pixel electrode is a transparent electrode or a non-transparent electrode; when the pixel electrode is disposed above the CF layer, the white sub-pixel unit is a reflection film layer and the pixel electrode is a transparent electrode. The reflective LCD panel of the present invention utilizes the combination of the white sub-pixel unit and the pixel electrode to improve the utilization of the ambient light, so as to enhance the brightness of the pixel unit and further enhance the brightness of the reflective LCD panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technique means and effect of the present invention, the following uses preferred embodiments and drawings for detailed description.

Figure 3:
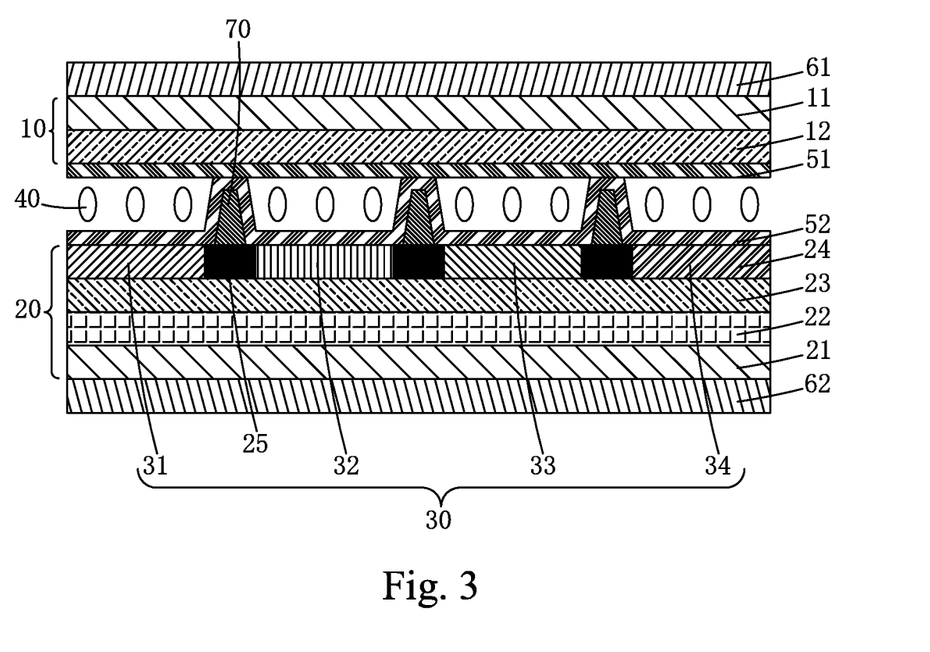
FIG. 3 is a schematic view showing the structure of a reflective LCD panel provided by a first embodiment of the present invention.

Refer to FIG. 3. The present invention provides a reflective LCD panel, which comprises: an upper substrate 10 and a lower substrate 20 disposed opposite to each other, and a liquid crystal (LC) layer 40 sandwiched between the upper substrate 10 and the lower substrate 20; the upper substrate 10 comprising: a first base substrate 11, a common electrode 12 disposed on the first base substrate 11; the lower substrate 20 comprising: a second base substrate 21, a thin film transistor (TFT) device layer 22 disposed on the second base substrate 21, a pixel electrode 23 disposed on the TFT device layer 22, and a color filter (CF) layer 24 and a black matrix (BM) 25 disposed on the pixel electrode 23;

wherein the CF layer 24 comprising a plurality of pixel units 30 arranged in an array, with each pixel unit comprising: a red sub-pixel unit 31, a green sub-pixel unit 32, a blue sub-pixel unit 33, and a white sub-pixel unit 34 separated by the BM 25; the red sub-pixel unit 31 able to reflect red light and absorb green light and blue light; the green sub-pixel unit 32 able to reflect green light and absorb red light and blue light; the blue sub-pixel unit 33 able to reflect blue light and absorb red light and green light;

when the white sub-pixel unit 34 being a transparent film, the pixel electrode 23 being a reflective electrode; when the white sub-pixel unit 34 being a reflective film, the pixel electrode 23 being a transparent electrode or non-transparent electrode.

Specifically, when the white sub-pixel unit 34 is a transparent film, the red light, green light and blue light are able to pass through the white sub-pixel unit 34; when the white sub-pixel unit 34 is a reflective film, the red light, green light and blue light are able to be reflected by the white sub-pixel unit 34.

When the white sub-pixel unit 34 is a transparent film layer, the pixel electrode 23 is a reflective electrode. The operation principle of the reflective LCD panel is: the white ambient light passes through the LC layer 40 to reach the red sub-pixel unit 31, the green sub-pixel unit 32, and the blue sub-pixel unit 33 of the CF layer 24; the red sub-pixel unit 31, the green sub-pixel unit 32, and the blue sub-pixel unit 33 of the CF layer 24 perform selective absorption and reflects red light, green light, blue light, respectively; the reflected red, green and blue light passes through the LC layer 40 again and emits from the surface of the upper substrate 10; the white ambient light passes through the LC layer 40 to reach the white sub-pixel unit 34 of the CF layer 24; the white ambient light passes through the white sub-pixel unit 34 of the CF layer 24 and is reflected by the pixel electrode 23; the reflected white light passes through the LC layer 40 again and emits from the surface of the upper substrate 10.

When the white sub-pixel unit 34 is a reflective film layer, the pixel electrode 23 is a transparent electrode or a non-transparent electrode. The operation principle of the reflective LCD panel is: the white ambient light passes through the LC layer 40 to reach the red sub-pixel unit 31, the green sub-pixel unit 32, and the blue sub-pixel unit 33 of the CF layer 24; the red sub-pixel unit 31, the green sub-pixel unit 32, and the blue sub-pixel unit 33 of the CF layer 24 perform selective absorption and reflects red light, green light, blue light, respectively; the reflected red, green and blue light passes through the LC layer 40 again and emits from the surface of the upper substrate 10; the white ambient light passes through the LC layer 40 to reach the white sub-pixel 34 of the CF layer 24; the white ambient light is reflected by the white sub-pixel unit 34; the reflected white light passes through the LC layer 40 again and emits from the surface of the upper substrate 10.

Compared to the conventional reflective LCD panel shown in FIG. 2, the present invention disposes a white sub-pixel unit 34 in the pixel unit 30 and uses the white sub-pixel unit 34 in collaboration with the pixel electrode 23 to add a beam of white light in the light emitted from the pixel unit 30 so as to increase the brightness of the pixel unit 30 and the emission brightness of the reflective LCD panel.

Specifically, the red sub-pixel unit 31, the green sub-pixel unit 32, the blue sub-pixel unit 33, and the white sub-pixel unit 34 of the pixel unit 30 can be arranged in the same row or in different rows, but all must be in the same layer.

Figure 5:
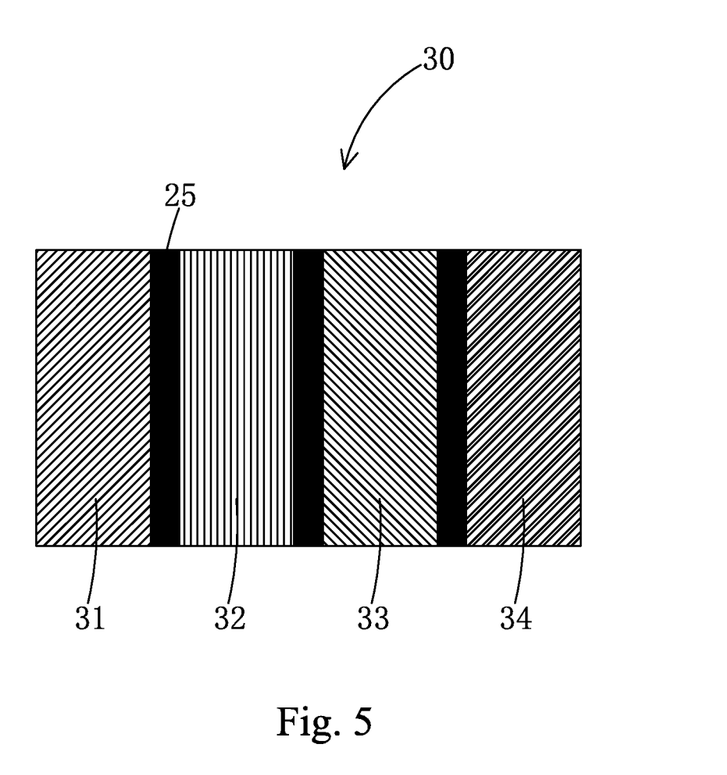
FIG. 5 is a schematic view showing the first arrangement of the pixel unit in the reflective LCD panel provided by the first and second embodiments of the present invention.

Specifically, the red sub-pixel unit 31, the green sub-pixel unit 32, the blue sub-pixel unit 33, and the white sub-pixel unit 34 of the pixel unit 30 are arranged in one of the following three arrangements:

As shown in FIG. 5, the first arrangement: the red sub-pixel unit 31, the green sub-pixel unit 32, the blue sub-pixel unit 33, and the white sub-pixel unit 34 are arranged in a row from left to right.

Figure 6:
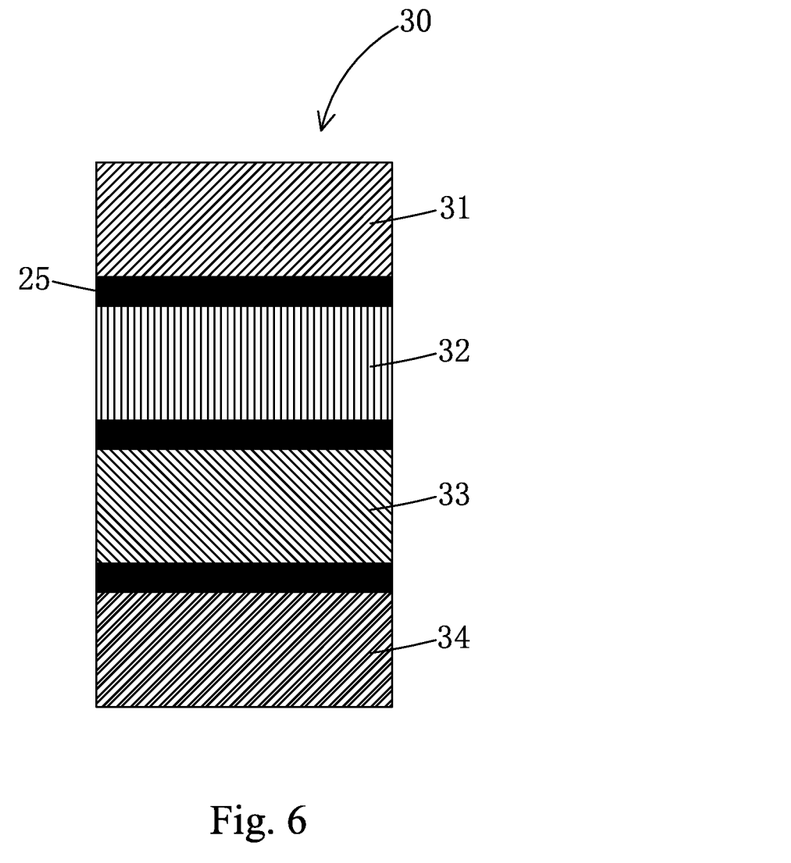
FIG. 6 is a schematic view showing the second arrangement of the pixel unit in the reflective LCD panel provided by the first and second embodiments of the present invention.

As shown in FIG. 6, the second arrangement: the red sub-pixel unit 31, the green sub-pixel unit 32, the blue sub-pixel unit 33, and the white sub-pixel unit 34 are arranged in a column from top to bottom.

Figure 7:
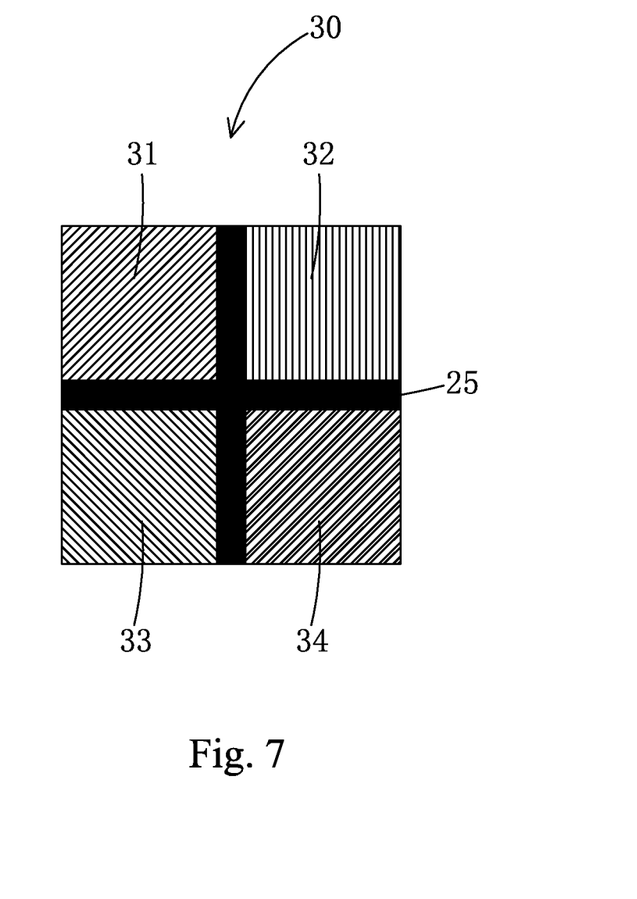
FIG. 7 is a schematic view showing the third arrangement of the pixel unit in the reflective LCD panel provided by the first and second embodiments of the present invention.

As shown in FIG. 7, the third arrangement: the red sub-pixel unit 31, the green sub-pixel unit 32, the blue sub-pixel unit 33, and the white sub-pixel unit 34 are arranged in an upper row and a lower row; the upper row comprises: from left to right, the red sub-pixel unit 31 and the green sub-pixel unit 32; the lower row comprises: from left to right, the blue sub-pixel unit 33 and the white sub-pixel unit 34; wherein the red sub-pixel unit 31 and the blue sub-pixel unit 33 form a column, and the green sub-pixel unit 32 and the white sub-pixel unit 34 form a column.

Specifically, the red sub-pixel unit 31, the green sub-pixel unit 32, the blue sub-pixel unit 33, and the white sub-pixel unit 34 have the same thickness, or slightly different.

Specifically, when the pixel electrode 23 is a reflective electrode, the pixel electrode 23 is made of metal, preferably, aluminum (Al); when the pixel electrode 23 is a transparent electrode, the pixel electrode 23 is made of a transparent conductive metal oxide, preferably ITO; and when the pixel electrode 23 is a non-transparent electrode, the pixel electrode 23 is made of metal, preferably, aluminum (Al).

Specifically, the red sub-pixel unit 31, the green sub-pixel unit 32, the blue sub-pixel unit 33, and the white sub-pixel unit 34 are all made of organic material.

Specifically, the BM 25 is to prevent the light from the adjacent sub-pixel units among the red sub-pixel unit 31, the green sub-pixel unit 32, the blue sub-pixel unit 33, and the white sub-pixel unit 34 from mixing, and to improve purity of the light color emitted from a single sub-pixel unit.

Specifically, the reflective LCD panel further comprises: a first alignment film 51 disposed at a side of the upper substrate 10 facing the LC layer 40; a second alignment film 52 disposed at a side of the lower substrate 20 facing the LC layer 40, an upper polarizer 61 disposed at a side of the upper substrate 10 facing away from the LC layer 40; and a lower polarizer 62 disposed at a side of the lower substrate 20 facing away from the LC layer 40; wherein the upper polarizer 61 and the lower polarizer 62 have absorbing axes mutually perpendicular to each other.

Moreover, the reflective LCD panel further comprises: a spacer 70 disposed between the BM 25 and the pixel electrode 23, the spacer 70 is to maintain the thickness of LC box so as to prevent the thickness of LC layer 40 from changing when the LCD panel is pressed. The disposition of the spacer 70 will not affect the aperture ratio of the pixel unit 30, which facilitates the aperture ratio of the LCD panel.

Preferably, the spacer 70 and the BM 25 are made of the same material and formed monolithically to save production time and cost.

The above reflective LCD panel adds a white sub-pixel unit 34 to the pixel unit 30 and disposes the pixel electrode 23 beneath the CF layer 24. The white sub-pixel unit 34 is a transparent film layer and the pixel electrode 23 is a reflective electrode. Alternatively, the white sub-pixel unit 34 is a reflective film layer and the pixel electrode 23 is a transparent electrode or non-transparent electrode. The present invention uses the white sub-pixel unit 34 in collaboration with the pixel electrode 23 to increase the brightness of the pixel unit 30 and the emission brightness of the reflective LCD panel.

Figure 4:
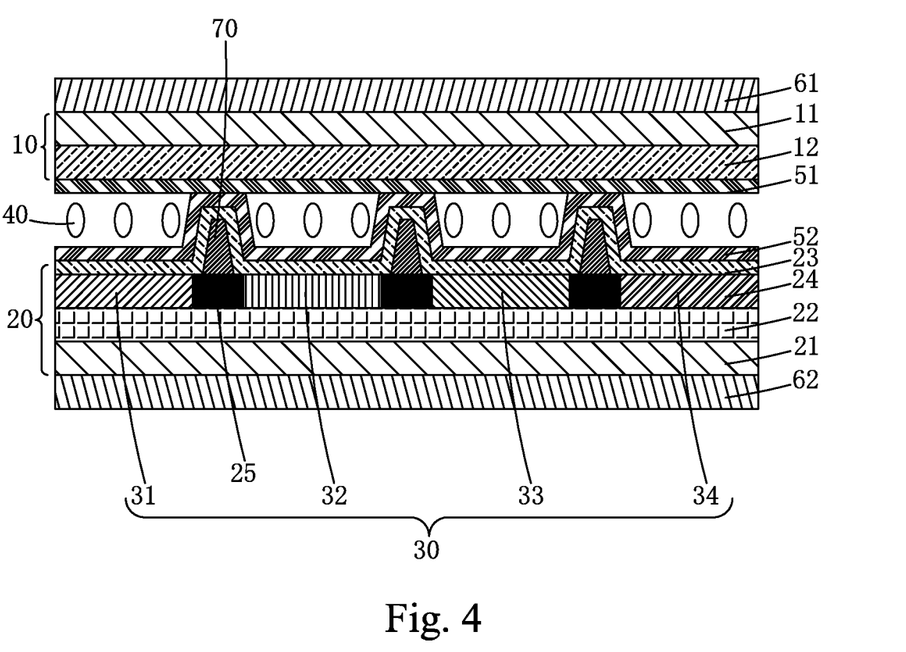
FIG. 4 is a schematic view showing the structure of a reflective LCD panel provided by a second embodiment of the present invention.

Refer to FIG. 4. The present invention also provides a reflective LCD panel, which comprises: an upper substrate 10 and a lower substrate 20 disposed opposite to each other, and a liquid crystal (LC) layer 40 sandwiched between the upper substrate 10 and the lower substrate 20; the upper substrate 10 comprising: a first base substrate 11, a common electrode 12 disposed on the first base substrate 11; the lower substrate 20 comprising: a second base substrate 21, a thin film transistor (TFT) device layer 22 disposed on the second base substrate 21, a color filter (CF) layer 24 and a black matrix (BM) 25 disposed on the TFT device layer 22, and a pixel electrode 23 disposed on the CF layer 24 and the BM 25;

wherein the CF layer 24 comprising a plurality of pixel units 30 arranged in an array, with each pixel unit comprising: a red sub-pixel unit 31, a green sub-pixel unit 32, a blue sub-pixel unit 33, and a white sub-pixel unit 34 separated by the BM 25; the red sub-pixel unit 31 able to reflect red light and absorb green light and blue light; the green sub-pixel unit 32 able to reflect green light and absorb red light and blue light; the blue sub-pixel unit 33 able to reflect blue light and absorb red light and green light;

the white sub-pixel unit 34 being a reflective film, the pixel electrode 23 being a transparent electrode.

Specifically, when the white sub-pixel unit 34 is a reflective film, the red light, green light and blue light are able to be reflected by the white sub-pixel unit 34.

The operation principle of the reflective LCD panel is: the white ambient light passes through the LC layer 40 and the pixel electrode 23 to reach the red sub-pixel unit 31, the green sub-pixel unit 32, and the blue sub-pixel unit 33 of the CF layer 24; the red sub-pixel unit 31, the green sub-pixel unit 32, and the blue sub-pixel unit 33 of the CF layer 24 perform selective absorption and reflects red light, green light, blue light, respectively; the reflected red, green and blue light passes through the LC layer 40 again and emits from the surface of the upper substrate 10; the white ambient light passes through the LC layer 40 and the pixel electrode 23 to reach the white sub-pixel 34 of the CF layer 24; the white ambient light is reflected by the white sub-pixel unit 34; the reflected white light passes through the pixel electrode 23 and the LC layer 40 again and emits from the surface of the upper substrate 10.

Compared to the conventional reflective LCD panel shown in FIG. 2, the present invention disposes a white sub-pixel unit 34 in the pixel unit 30 and uses the white sub-pixel unit 34 in collaboration with the pixel electrode 23 to add a beam of white light in the light emitted from the pixel unit 30 so as to increase the brightness of the pixel unit 30 and the emission brightness of the reflective LCD panel.

Specifically, the red sub-pixel unit 31, the green sub-pixel unit 32, the blue sub-pixel unit 33, and the white sub-pixel unit 34 of the pixel unit 30 can be arranged in the same row or in different rows, but all must be in the same layer.

Specifically, the red sub-pixel unit 31, the green sub-pixel unit 32, the blue sub-pixel unit 33, and the white sub-pixel unit 34 of the pixel unit 30 are arranged in one of the following three arrangements:

As shown in FIG. 5, the first arrangement: the red sub-pixel unit 31, the green sub-pixel unit 32, the blue sub-pixel unit 33, and the white sub-pixel unit 34 are arranged in a row from left to right.

As shown in FIG. 6, the second arrangement: the red sub-pixel unit 31, the green sub-pixel unit 32, the blue sub-pixel unit 33, and the white sub-pixel unit 34 are arranged in a column from top to bottom.

As shown in FIG. 7, the third arrangement: the red sub-pixel unit 31, the green sub-pixel unit 32, the blue sub-pixel unit 33, and the white sub-pixel unit 34 are arranged in an upper row and a lower row; the upper row comprises: from left to right, the red sub-pixel unit 31 and the green sub-pixel unit 32; the lower row comprises: from left to right, the blue sub-pixel unit 33 and the white sub-pixel unit 34; wherein the red sub-pixel unit 31 and the blue sub-pixel unit 33 form a column, and the green sub-pixel unit 32 and the white sub-pixel unit 34 form a column.

Specifically, the red sub-pixel unit 31, the green sub-pixel unit 32, the blue sub-pixel unit 33, and the white sub-pixel unit 34 have the same thickness, or slightly different.

Specifically, the pixel electrode 23 is made of a transparent conductive metal oxide, preferably ITO.

Specifically, the red sub-pixel unit 31, the green sub-pixel unit 32, the blue sub-pixel unit 33, and the white sub-pixel unit 34 are all made of organic material.

Specifically, the BM 25 is to prevent the light from the adjacent sub-pixel units among the red sub-pixel unit 31, the green sub-pixel unit 32, the blue sub-pixel unit 33, and the white sub-pixel unit 34 from mixing, and to improve purity of the light color emitted from a single sub-pixel unit.

Specifically, the reflective LCD panel further comprises: a first alignment film 51 disposed at a side of the upper substrate 10 facing the LC layer 40; a second alignment film 52 disposed at a side of the lower substrate 20 facing the LC layer 40, an upper polarizer 61 disposed at a side of the upper substrate 10 facing away from the LC layer 40; and a lower polarizer 62 disposed at a side of the lower substrate 20 facing away from the LC layer 40; wherein the upper polarizer 61 and the lower polarizer 62 have absorbing axes mutually perpendicular to each other.

Moreover, the reflective LCD panel further comprises: a spacer 70 disposed between the BM 25 and the second alignment film 52, the spacer 70 is to maintain the thickness of LC box so as to prevent the thickness of LC layer 40 from changing when the LCD panel is pressed. The disposition of the spacer 70 will not affect the aperture ratio of the pixel unit 30, which facilitates the aperture ratio of the LCD panel.

Preferably, the spacer 70 and the BM 25 are made of the same material and formed monolithically to save production time and cost.

The above reflective LCD panel adds a white sub-pixel unit 34 to the pixel unit 30 and disposes the pixel electrode 23 above the CF layer 24. The white sub-pixel unit 34 is a reflective film layer and the pixel electrode 23 is a transparent electrode. The present invention uses the white sub-pixel unit 34 in collaboration with the pixel electrode 23 to increase the brightness of the pixel unit 30 and the emission brightness of the reflective LCD panel.

In summary, the present invention provides a reflective LCD panel. The reflective LCD panel of the present invention is disposed with white sub-pixel unit in the pixel unit. When the pixel electrode is disposed below the CF layer, the white sub-pixel unit is a transparent film layer and the pixel electrode is a reflective electrode, or when the white sub-pixel unit is a reflective film layer, the pixel electrode is a transparent electrode or a non-transparent electrode; when the pixel electrode is disposed above the CF layer, the white sub-pixel unit is a reflection film layer and the pixel electrode is a transparent electrode. The reflective LCD panel of the present invention utilizes the combination of the white sub-pixel unit and the pixel electrode to improve the utilization of the ambient light, so as to enhance the brightness of the pixel unit and further enhance the brightness of the reflective LCD panel.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claim of the present invention.

What is claimed is:

1. A reflective liquid crystal display (LCD) panel, which comprises: an upper substrate and a lower substrate disposed opposite to each other, and a liquid crystal (LC) layer sandwiched between the upper substrate and the lower substrate; the upper substrate comprising: a first base substrate, and a common electrode disposed on the first base substrate; the lower substrate comprising: a second base substrate, a thin film transistor (TFT) device layer disposed on the second base substrate, a color filter (CF) layer and a black matrix (BM) disposed on the TFT device layer, and a pixel electrode disposed on the CF layer and the BM;

wherein the CF layer comprises a plurality of pixel units arranged in an array, each of the plurality of pixel units comprising: a red sub-pixel unit, a green sub-pixel unit, a blue sub-pixel unit, and a white sub-pixel unit separated by the BM; the red sub-pixel unit reflecting red light and absorbing green light and blue light; the green sub-pixel unit reflecting green light and absorbing red light and blue light; the blue sub-pixel unit reflecting blue light and absorbing red light and green light;

wherein the white sub-pixel unit comprises a reflective film and reflects red light, green light, and blue light, and the pixel electrode comprises a transparent electrode that is disposed on the CF layer and the BM, wherein the transparent electrode is directly disposed on red sub-pixel unit, the green sub-pixel unit, the blue sub-pixel unit, and the white sub-pixel unit of the CF layer, and a part of the transparent electrode is stacked directly on the reflective film of the white sub-pixel unit.

2. The reflective LCD panel as claimed in claim 1, wherein the red sub-pixel unit, the green sub-pixel unit, the blue sub-pixel unit, and the white sub-pixel unit of the pixel unit are arranged in following arrangement: the red sub-pixel unit, the green sub-pixel unit, the blue sub-pixel unit, and the white sub-pixel unit being arranged in a row from left to right.

3. The reflective LCD panel as claimed in claim 1, wherein the red sub-pixel unit, the green sub-pixel unit, the blue sub-pixel unit, and the white sub-pixel unit have the same thickness; the pixel electrode is made of a transparent conductive metal oxide.

4. The reflective LCD panel as claimed in claim 1, wherein the reflective LCD panel further comprises: a first alignment film disposed at a side of the upper substrate facing the LC layer; a second alignment film disposed at a side of the lower substrate facing the LC layer, an upper polarizer disposed at a side of the upper substrate facing away from the LC layer; and a lower polarizer disposed at a side of the lower substrate facing away from the LC layer; wherein the upper polarizer and the lower polarizer have absorbing axes mutually perpendicular to each other.

5. The reflective LCD panel as claimed in claim 1, wherein the reflective LCD panel further comprises: a spacer disposed between the BM and the pixel electrode, the spacer and the BM are made of the same material and formed monolithically.

\* \* \* \* \*